United States Patent
Dozoretz et al.

(10) Patent No.: US 6,909,975 B2
(45) Date of Patent: Jun. 21, 2005

(54) INTEGRATED ABSOLUTE AND DIFFERENTIAL PRESSURE TRANSDUCER

(75) Inventors: Paul Dozoretz, Hudson, CO (US); Youfan Gu, Superior, CO (US); Garry Holcomb, Boulder, CO (US); Ole Wenzel, Aalsgaarde (DK)

(73) Assignee: MKS Instruments, Inc., Wilmington, MA (US)

( * ) Notice: Subject to any disclaimer, the term of this patent is extended or adjusted under 35 U.S.C. 154(b) by 20 days.

(21) Appl. No.: 10/721,817

(22) Filed: Nov. 24, 2003

(65) Prior Publication Data

US 2005/0114070 A1 May 26, 2005

(51) Int. Cl.⁷ .............................. G01F 23/14; G01L 9/12
(52) U.S. Cl. ........................ 702/50; 73/152.53; 73/724; 702/45; 702/47; 702/55

(58) Field of Search ............................... 702/45, 47, 50, 702/55, 100, 114; 73/19.02, 28.01, 152.53, 724; 118/715; 700/281–285

(56) References Cited

U.S. PATENT DOCUMENTS

| | | | |
|---|---|---|---|
| 3,350,931 A | * 11/1967 | Johnson et al. | ........... 73/152.53 |
| 5,107,441 A | * 4/1992 | Decker | ........................ 702/47 |
| 6,672,171 B2 | * 1/2004 | Gu et al. | ....................... 73/724 |
| 2001/0029889 A1 | * 10/2001 | Holcomb et al. | ........... 118/715 |

* cited by examiner

Primary Examiner—John Barlow
Assistant Examiner—John Le
(74) Attorney, Agent, or Firm—Cochran Freund & Young LLC; James R. Young

(57) ABSTRACT

A method and apparatus integrates differential pressure measurements and absolute pressure measurements to provide virtual absolute pressure measurements over a wide range of pressures on a single integrated scale.

23 Claims, 7 Drawing Sheets

| $P_{20}$ | $P_{30}$ | |
|---|---|---|
| Chamber Pressure Absolute $P_c$ (torr) | Sea Level $\Delta P$ (torr) | High Plains $\Delta P$ (torr) |
| Sea Level $P_A$ — 1000 | 240 | 370 |
| — 760 | 0 | |
| High Plains $P_A$ — 630 | | 0 |
| | | 130 torr |
| $P_x$ — 100 | −660 | −530 |
| 10 | −750 | −620 |
| $P_t$ — 1 | −759 | −629 |
| ($10^{-1}$) 0.1 | −759.9 | −629.9 |
| ($10^{-2}$) 0.01 | −759.99 | −629.99 |
| ($10^{-3}$) 0.001 | −759.999 | −629.999 |
| ($10^{-4}$) 0.0001 | −759.9999 | −629.9999 |
| ($10^{-5}$) 0.00001 | −759.99999 | −629.99999 |

FIG. 2

INTEGRATED ABSOLUTE AND DIFFERENTIAL PRESSURE TRANSDUCER

BACKGROUND OF THE INVENTION

1. Field of the Invention

This invention is related to pressure sensors and, more particularly, to an integrated absolute and differential pressure sensor that can provide normalized, absolute and differential pressure measurements and outputs over a broad range of sub-atmospheric, atmospheric, and super-atmospheric pressures.

2. State of the Prior Art

In some process, control, or monitoring applications, it would be very beneficial to have the capability of sensing pressure and providing accurate and repeatable pressure measurement or control outputs over a broad pressure range, such as from $10^{-8}$ torr or lower to $10^3$ (1,000) torr or higher. For example, in a physical vapor deposition (PVD) or chemical vapor deposition (CVD) vacuum process chamber for depositing thin films of semiconductor materials on substrates or wafers to fabricate semi-conductor devices, a common deposition process practice may be some variation of the following: (i) Load the substrate or wafer into the vacuum process chamber at atmospheric pressure (e.g., about 600–770 torr); (ii) Close and seal the process chamber and evacuate it to $10^{-7}$ torr or less and hold it there for some period of time to remove all of the air, water vapor, and other potential contaminants, (iii) Back-fill the chamber with inert or over-pressure gas to bring the process chamber back up to about $10^{-3}$ torr, where it is maintained while process and carrier gasses are fed into the chamber to react or otherwise form a thin film of the desired semiconductor material(s) on the substrate or wafer, while effluents comprising gaseous by-products, unreacted and excess process gasses, and carrier gasses are drawn out of the process chamber; (iv) Stopping the process gasses; and (v) Back-filling the process chamber to increase the pressure in the chamber back to atmospheric pressure so that the chamber can be opened to remove the processed device.

Another approach is to keep the process chamber at the very low process pressure (vacuum) range used for the deposition processes, while a separate, often smaller, load lock chamber is used to handle the wafers before and after processing, i.e., to cycle between atmospheric pressure and process pressure to move the wafers into and out of the process chamber. The process chamber, when used with such a load lock, is only exposed to atmospheric pressure, therefore, when it is opened for servicing.

Such vacuum process and load lock systems currently require a plurality of different kinds of individual pressure sensors to measure and/or control pressures over such large ranges. For example, hot cathode pressure sensors are considered to be accurate and dependable for absolute pressure measurements in a range of about $5 \times 10^{-10}$ to $5 \times 10^{-2}$ torr, but they are not useful for pressures above $5 \times 10^{-2}$ torr and have to be turned off to avoid burning out the filaments inside the hot cathode gauges. On the other hand, conventional convection pirani pressure sensors have absolute pressure measuring capabilities in a range of about $10^{-3}$ torr to 1,000 torr, but they are not useful for pressures below $10^{-3}$ torr, and they have a flat zone in a range of about 10 to 1,000 torr in which accuracy is low. A micropirani pressure sensor, such as the micropirani pressure sensor described in published U.S. patent application Ser. No. 09/907,541, which is incorporated herein by reference, can extend that range down to about $10^{-5}$ torr and alleviate the flat zone, but that range still is not sufficient alone for many processes.

Further, absolute pressure sensors are problematic in applications such as the vacuum process chamber described above, because, while it may be desirable to open the process chamber door at or very near ambient atmospheric pressure, ambient atmospheric pressure varies, depending on elevation above sea level, weather patterns, and the like, so any particular set point of an absolute pressure sensor is unlikely to match atmospheric pressure consistently. Thus, a differential pressure sensor may be required in addition to the one or two different kinds of absolute pressure sensors described above to provide the required process pressure measurements and controls, which still does not address the flat zone problems, especially where critical process operations are required or desired at pressures that coincide with such flat zones.

The combination absolute and differential pressure transducer described in the U.S. patent application Ser. No. 09/907,541, published on Jan. 16, 2003, provides a beneficial combination of an absolute pressure sensor with a differential pressure sensor for controlling the opening or closing of interior and exterior doors and other functions of load locks for vacuum processing chambers of transfer chambers. However, the absolute pressure measurements and the differential pressure measurements are separate from each other, and it provides no way to obtain or track absolute pressures above the absolute pressure measuring capability of the absolute pressure sensor and through the differential pressure sensor ranges. Of course, one or more different types of absolute pressure sensors could be added to the combination to provide higher absolute pressure measurements in the higher, differential pressure measurement ranges, but such additional pressure transducers add to the cost of the process equipment and are still not truly integrated in their respective measurements. Many process chamber operators and quality control technicians would like to see an entire process pressure profile on a single absolute pressure scale from atmospheric pressure or higher and down to the lowest vacuum pressure and then back up through those ranges to atmosphere again.

SUMMARY OF THE INVENTION

A general object of this invention, therefore, is to provide a method and apparatus for measuring and/or controlling pressures over wide pressure ranges with absolute and/or differential pressure outputs extending in an integrated manner over such ranges.

A more specific object of the invention is to provide real time absolute pressure measurements on a single scale extending from above atmospheric pressure to very low vacuum pressures.

A more specific object of this invention is to provide integrated absolute and/or differential pressure measurement and output capabilities over a pressure range of $10^{-8}$ torr or lower to $10^3$ torr or higher with as few as one or two absolute pressure sensors and one differential pressure sensor.

To achieve the foregoing and other objects, a method and apparatus for measuring absolute pressure in a chamber includes determining a correlation factor between absolute and differential pressure measurements taken simultaneously at a pressure where the absolute pressure in the chamber can be measured accurately and reliably, and then adjusting differential pressure measurements with the correlation factor to provide virtual absolute pressure measurements. The absolute pressure measurements are used in chamber pressure ranges where they are more accurate and reliable than the virtual absolute pressure measurements, and the virtual absolute pressure measurements are used in chamber pressure ranges where they are more accurate and reliable than the absolute pressure measurements. The correlation factor is re-determined periodically to adjust for changes in atmospheric pressure. The scope of the invention is defined in the claims below.

BRIEF DESCRIPTION OF THE DRAWINGS

The accompanying drawings, which are incorporated in and form a part of the specification, illustrate the preferred embodiments of the present invention, and together with the written description and claims, serve to explain the principles of the invention. In the drawings:

FIG. 2 is a chart showing absolute pressures juxtaposed to example sea level and high plains atmospheric pressures to illustrate a problem addressed by, and some fundamentals of, this invention;

DETAILED DESCRIPTION OF THE PREFERRED EMBODIMENTS

Figure 1:
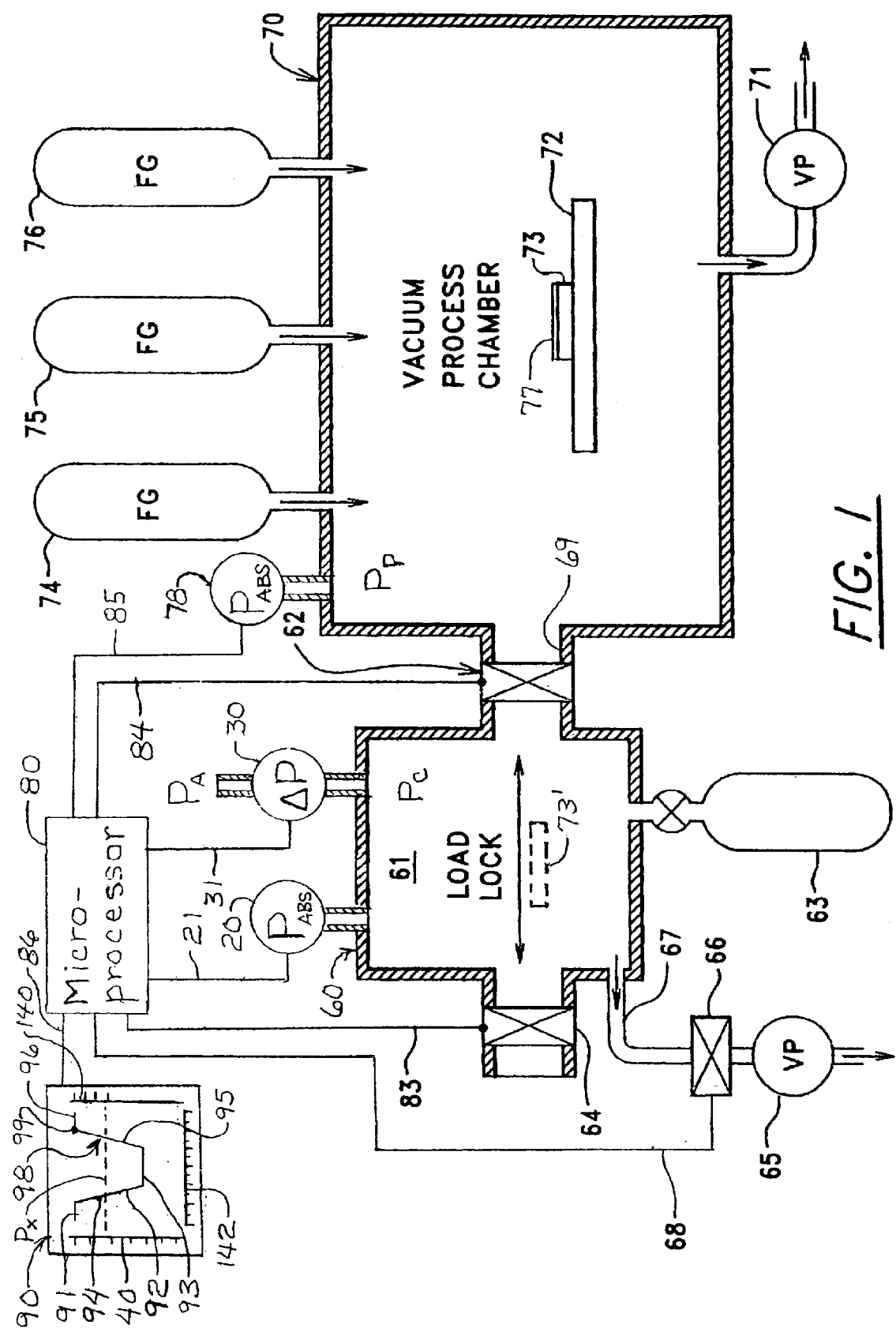
FIG. 1 is a diagrammatic view of a load lock for a vacuum process chamber fitted with an absolute pressure sensor and a differential pressure sensor for measuring absolute pressures in a chamber on a continuous scale over a large pressure range according to this invention.

The present invention is illustrated for example, but not for limitation, in FIG. 1 by two pressure sensors 20, 30 connected in fluid flow relation to a chamber, which in this example is the interior 61 of a load lock chamber 60, and a microprocessor 80, which receives and processes signals originating from the pressure sensors 20, 30 to provide extended scale absolute pressure measurements of the chamber pressure $P_C$, as represented by the display 90. The first pressure sensor 20 is an absolute pressure sensor ($P_{ABS}$) for sensing the absolute pressure $P_C$ in the chamber 61. The second pressure sensor 30 is a differential pressure sensor ($\Delta P$) for sensing the difference between the atmospheric pressure $P_A$ outside the chamber 61 and the gas pressure $P_C$ inside the chamber 61. In other words, $P_{ABS}=P_P$, and $\Delta P=P_A-P_P$.

To provide some context to aid in understanding the invention, a load lock 60 is often used in semiconductor fabrication to shuttle one or more wafers 73 into and out of a vacuum process chamber 70, where one or more feed gases delivered from feed gas sources 74, 75, 76 are reacted to deposit thin film materials, such as semiconductor material 77, on the wafer 73. A vacuum pump 71 connected to the interior of the vacuum process chamber 70 pumps gases out of the vacuum process chamber 70 to maintain a desired vacuum, i.e., low pressure, usually less than 1 torr and can be down to $10^{-8}$ torr or less, depending on the process requirements. A platform 72 is usually provided in the vacuum process chamber 70 for supporting the wafer 73 during processing.

The interior chamber 61 of load lock 60 in this example is connected by a passage 69 to the interior of the vacuum process chamber 70. The purpose of the load lock 60 is to facilitate transfer of the wafers 73 from the outside (e.g., ambient) atmosphere into the vacuum process chamber 70 without losing the vacuum in the vacuum process chamber 70 or allowing contaminants into the vacuum process chamber 70. Therefore, an interior door or valve 62 in the passage 69 opens the passage 69 to allow transfer of wafers 73 into and out of the vacuum process chamber 70 and closes the passage way 69 to seal the vacuum process chamber from the load lock chamber 61, when there are no such transfers being conducted. In some process tools, there is an intermediate transfer chamber (not shown) between the load lock and several process chambers to facilitate transferring wafers from one process chamber to another without having to go through the load lock or the atmosphere.

An exterior door 64 on the load lock 60 opens and closes the load lock chamber 61 to the atmosphere. When a wafer, illustrated in phantom lines 73' to indicate its transitory position, is being transferred from the outside atmosphere into the load lock chamber 61, the interior door 62 is closed, and the exterior door 64 is open. With the exterior door 64 open, the absolute chamber pressure $P_C$ in the load lock 60 is substantially equal to the absolute atmospheric pressure $P_A$ outside the chamber 61, as indicated at 91 in the display 90, so the differential pressure $\Delta P$ is zero. Meanwhile, the vacuum in the vacuum process chamber 70 behind the closed interior door 62 is maintained, i.e., at a much lower pressure $P_P$ than the outside atmospheric pressure $P_A$. Then, with the wafer 73' inside the load lock chamber 61, the exterior door 64 is closed, and a vacuum pump 65 connected to the load lock chamber 61 pumps enough of the air and other gases out of the load lock chamber 61 to remove potential contaminants and to reduce the absolute chamber pressure $P_C$, as indicated by the sloped line 92 in the display 90, to a desired level 93 that substantially matches the low absolute pressure $P_P$ in the vacuum process chamber 70, which can be measured with an absolute pressure sensor 78. At some chamber pressure $P_C$, such as the pressure point 94, during the pump-down phase 92, where most of the air and potential contaminants have been pumped out of the chamber 61, a common practice is to open a throttle valve 66 to bolster the pump-down speed in the lower absolute chamber pressure $P_C$ portion of the pump-down phase 92. This pressure point 94 is often called a cross-over pressure, because it is where the pump-down of the chamber 91 crosses over from slow to high speed. However, that term for such operation or functionality is not used here to avoid confusion with another cross-over function explained below, which is more central to this invention.

With the absolute chamber pressure $P_C$ pumped down to substantially the same level 93 as the absolute pressure $P_P$ in the vacuum process chamber 70, the interior door 62 can be opened to allow the wafer 73 to be transferred into the vacuum process chamber 70 and placed on the platform 72. A moveable shuttle (not shown) in the load lock 60 is used to move the wafer 72 into and out of the vacuum process chamber 70, as is well-known to persons skilled in the art.

With the wafer 73 in place on the platform 72, the interior door can be closed for a time, while the semiconductor material 77 is deposited on the substrate 73. The absolute chamber pressure $P_C$ can be maintained at the low level 93 during the deposition of the semiconductor material 77. When the semiconductor material 77 is deposited on the wafer 73, the interior door 82 is opened again to transfer the wafer 73 back into the load lock chamber 61. Then, the interior door 62 is closed again to isolate the interior of the vacuum process chamber 70 from the load lock chamber 61, so that the absolute chamber pressure $P_C$ can be raised, as indicated at 95, back to atmospheric pressure $P_A$, as indicated at 96, without affecting the process pressure $P_P$ in the vacuum process chamber 70. A common practice is to use a gas, such as nitrogen, or an inert gas, such as argon, from a source 63 to back-fill the load lock chamber 61 to raise the absolute chamber pressure $P_C$ back up to atmospheric pressure $P_A$, but air is also sometimes used for this purpose.

While it is important to have accurate and reliable absolute pressure measurements of the chamber pressure $P_C$ going down to the absolute chamber pressure $P_C$ level 93 in order to match the process pressure $P_P$ in the vacuum process chamber 70 before opening the interior door 62, as explained above, it is also important to be able to measure accurately when the chamber pressure $P_C$ matches the atmospheric pressure $P_A$ before the exterior door is opened. Unfortunately, however, there are no absolute pressures sensors that can measure the absolute chamber pressure $P_C$ accurately and reliably over the full pressure range from atmospheric pressure $P_A$ level 91 down to the low pressure level 93 that is needed to match the process pressure $P_P$ in the vacuum process chamber 70. Also, the atmospheric pressure $P_A$ varies significantly with elevation above sea level and with ambient weather conditions, so there is no fixed absolute pressure set point that can be used for the chamber pressure $P_C$ to open the exterior door 64. Consequently, it is necessary to use an absolute pressure sensor 20 that is accurate and reliable at the lower pressure levels to measure absolute chamber pressure $P_C$ for determining when to open the interior door 62, but also to use a differential pressure sensor 30 for determining when the chamber pressure $P_C$ matches the atmospheric pressure $P_A$ in order to open the exterior door 64 at or near atmospheric pressure $P_A$ as indicated at 99 in the display 90. Of course, two higher pressure range absolute pressure sensors (not shown), one for measuring absolute atmospheric pressure $P_A$ and the other for measuring absolute chamber pressure $P_C$, and an analog or digital comparator circuit (not shown), microprocessor, or other means for comparing such measurements, could be substituted for the differential pressure sensor 30, as is understood by persons skilled in the art.

Therefore, the use of the term "differential pressure sensor" herein is meant to include not only conventional, direct read differential pressure sensors or gauges, but also the use of two absolute pressure sensors with circuitry for subtracting measurements of one from measurements of the other to measure differential pressures, as well as any other apparatus or method that is capable of providing differential pressure measurements.

Use of an absolute pressure sensor 20 for determining when the absolute chamber pressure $P_C$ is low enough to open the interior door 62 in combination with a differential pressure sensor 30 for determining when to open the exterior door 64 of a load lock 60 is well-known, as explained in the published U.S. patent application Ser. No. 09/907,541 and U.S. patent application Ser. No. 09/815,376, both of which are incorporated herein by reference. However, as mentioned above, many vacuum process chamber operators, quality control personnel, and others would like to have a full absolute pressure profile 98 on a single scale that extends over the full chamber pressure $P_C$ range of operation from absolute atmospheric pressure $P_A$ level 91, 96 or above, down to the lowest absolute pressure level 93 or below for diagnostic, quality control, design, maintenance, and other reasons.

An important feature of this invention, therefore, is to integrate pressure measurements from at least one low or mid-level absolute pressure sensor 20 with differential pressure measurements from the differential pressure sensor 30 to produce accurate and reliable absolute pressure measurements of the chamber pressure $P_C$ on a single scale that extends over a range low enough for opening the interior door 62 in this kind of load lock as well as other process applications and high enough to provide a complete absolute chamber pressure $P_C$ profile 98, including absolute atmospheric pressure $P_A$. However, this invention is not limited to load lock applications. On the contrary, it is useable for any other application in which such an extended absolute pressure measurement range beyond (above or below) the acceptable accuracy and reliability range of a low or mid-level absolute pressure sensor is needed or desired.

Figure 3:
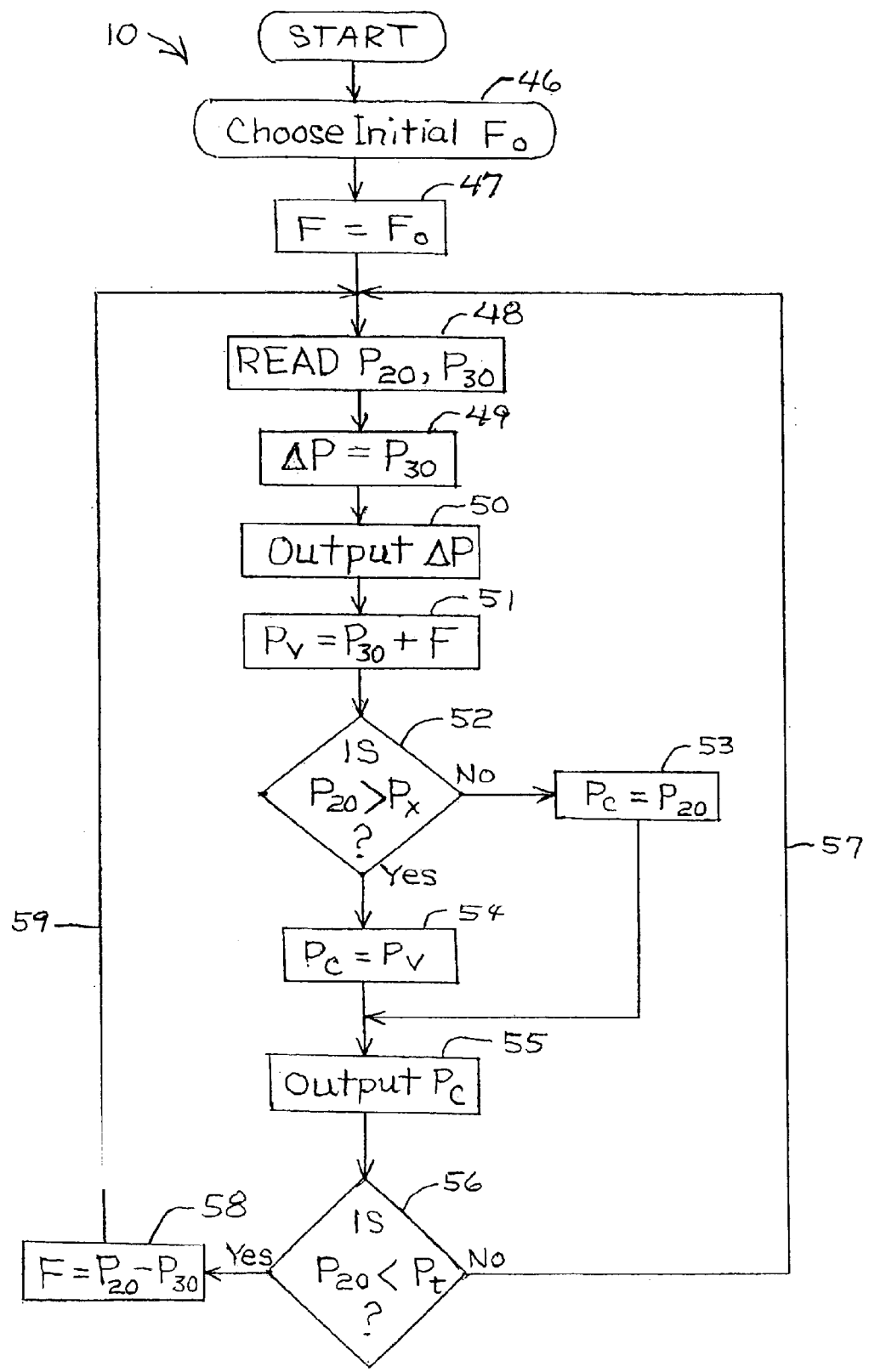
FIG. 3 is a logic flow chart illustrating an algorithm used in this invention to extend absolute pressure measurement range into the differential pressure sensor range.

According to this invention, as illustrated in FIG. 2, the measurements provided by the absolute pressure sensor 20 are used for the absolute chamber pressures $P_C$ below a cross-over pressure $P_X$ level or range on an absolute pressure scale 40 in the display 90, where the absolute pressure sensor 20 has the capability to provide accurate and reliable absolute pressure measurements. However, for absolute chamber pressure $P_C$ measurements above the cross-over pressure level or range $P_X$, where the absolute pressure sensor 20 does not provide sufficiently accurate and reliable absolute pressure measurements, normalized virtual differential pressure measurements, which are based on differential pressure measurements $P_{30}$ from the differential pressure sensor 30 are used for the absolute chamber pressure $P_C$ on the absolute pressure scale 40 in the display 90. To normalize such differential pressure measurements $P_{30}$ from the differential pressure sensor 30 for this purpose, they are correlated with measurements $P_{20}$ of absolute chamber pressure $P_C$ from the absolute pressure sensor 20 at or below a correlation pressure threshold point $P_t$, which is preferably at or near a pressure where the practical accuracy of the differential pressure sensor 30 effectively reaches its bottom, i.e., where further decimal places of pressure measurements are not meaningful or significant in a practical application or where physical structure or electric circuit limitations render lower differential pressure $\Delta P$ measurements with the differential pressure sensor 30 practically meaningless. This correlation pressure threshold point $P_t$, or any pressure lower than $P_t$ that is still within an accurate and reliable absolute pressure measuring range of the absolute pressure sensor 20, can be used as a base line for adjusting or normalizing the differential pressure $\Delta P$ measurements $P_{30}$ from the differential pressure sensor 30 to correlate with the absolute chamber pressure $P_C$ measurements $P_{20}$ from the absolute pressure pressure sensor 20 at a desired level of accuracy, as will be explained in more detail below. Therefore, such adjustment or normalizing correlation factor F can be used to convert or normalize all higher differential pressure $\Delta P$ measurements $P_{30}$ from the differential pressure sensor 30 to the same scale as the absolute chamber pressure $P_C$ measurements $P_{20}$ from the absolute pressure sensor 20, as is shown in FIG. 3 and will be described in more detail below. Consequently, as the chamber pressure $P_C$ rises above that correlation pressure threshold $P_t$, the correlation factor F can be added to all of the differential pressure $\Delta P$ measurements from the differential pressure sensor 30 to convert them to virtual absolute chamber pressure $P_C$ measurements $P_V$ correlated to the same absolute pressure scale 40 as the absolute pressure measurements $P_{20}$ produced by the absolute pressure sensor 20.

Eventually, as the chamber pressure $P_C$ continues to increase, it will reach some chamber pressure $P_C$ level that is still substantially below the atmospheric pressure $P_A$, but which is above the accurate and reliable absolute pressure measuring capability of the absolute pressure sensor 20. Therefore, the absolute chamber pressure $P_C$ measurements $P_{20}$ by the absolute pressure sensor 20 above that accuracy and reliability level become unreliable and unusable. However, the differential pressure sensor 30 continues to provide accurate and reliable differential pressure $\Delta P$ measurements as the chamber pressure $P_C$ rises all the way up to the atmospheric pressure $P_A$ and beyond. Therefore, in the higher chamber pressure $P_C$ levels, where the absolute pressure measurements $P_{20}$ by the absolute pressure sensor 20 are unreliable, accurate and reliable virtual absolute chamber pressure $P_C$ measurements $P_V$ can be provided on the same continuous scale 40 all the way up to the atmospheric pressure $P_A$ level and beyond by adding the correlation factor F to the differential pressure $\Delta P$ measurements $P_{30}$ from the differential pressure sensor 30.

It is preferable, however, to not wait until the absolute pressure sensor 20 reaches the end of its accuracy and reliability range before crossing over to the virtual absolute chamber pressure $P_C$ measurements $P_V$ for output by the microprocessor 80 and display by the display device 90. Instead, it is preferable, but not essential, to select a cross-over pressure level $P_X$, which can be either a distinct cross-over pressure point or a cross-over pressure range with a smoothing function (explained in more detail below), at which the displayed absolute chamber pressure profile 98 is assembled from the virtual absolute chamber pressure $P_C$ measurements $P_V$ rather than from the absolute pressure sensor 20 measurements $P_{20}$, as will be explained in more detail below.

To further illustrate one of the principles on which this invention is founded, the absolute pressures $P_{ABS}$ in a typical vacuum process range are juxtaposed in FIG. 2 to corresponding differential pressures $\Delta P$ on a logarithmic scale 40 in units of torr, although any other units of pressure could also be used. In the first column 42 in FIG. 2, a scale of absolute pressures $P_{ABS}$ is shown extending from 1,000 torr at the upper end of the scale 40 down to $10^{-5}$ torr (0.00001 torr) at the lower end of the scale 40. Some processes are performed in pressures as low as $10^{-8}$ torr or lower, but it is not necessary to extend the scale 40 in this FIG. 2 that low in order to convey the principles of this invention.

Two arbitrary different example atmospheric pressures $P_A$—sea level and high plains, e.g., Boulder, Colo. U.S.A.— are used in FIG. 2 to facilitate an explanation of this invention, but any other example atmospheric pressures could also be used. Also, while 760 torr is considered by persons skilled in the art to be a standard atmospheric pressure $P_A$ at sea level, the actual atmospheric pressure $P_A$ will vary above and below that 760 torr level due to various weather patterns. Likewise, while 630 torr is a common atmospheric pressure $P_A$ at high plains and foothills locations, such as Boulder, Colo. U.S.A., the actual atmospheric pressure $P_A$ at any such location will vary above and below that level as weather patterns change. However, such variations are accommodated by this invention in order to continue making very accurate and reliable absolute pressure $P_{ABS}$ measurements, regardless of atmospheric pressure $P_A$ changes, as will be understood by persons skilled in the art, once they understand this invention. In fact, as mentioned above, one of the purposes of this invention is to provide accurate and reliable chamber pressure $P_C$ measurements up to and beyond whatever local atmospheric pressure $P_A$ might exist at any time, even as such local atmospheric pressure $P_A$ changes from day-to-day, hour-to-hour, or smaller increments of time.

As illustrated in FIG. 2, when the atmospheric pressure $P_A$ is, for example, 760 torr and the absolute chamber pressure $P_C$ (FIG. 1) is also 760 torr, such as when the exterior door 64 is open, then the differential pressure $\Delta P$ between the atmospheric pressure $P_A$ and the chamber pressure $P_C$ in the chamber 61 (FIG. 1) will be, of course, zero, as shown in column 44 in FIG. 2. As the chamber 61 is evacuated by the vacuum pump 65 (FIG. 1), and the absolute chamber pressure $P_C$ is lowered by 660 torr to the absolute chamber pressure $P_C$ of, for example, 100 torr, the differential pressure $\Delta P$ will also drop from zero to −660 torr, shown in FIG. 2.

Likewise, if the process is being performed at a high plains location with an atmospheric pressure $P_A$ of, for example, 630 torr instead of the 760 torr sea level atmospheric pressure, the differential pressure $\Delta P$ between the atmospheric pressure $P_A$ and the chamber pressure $P_C$ with the exterior door 64 open, will also be zero, as shown in FIG. 2. However, there is a 130 torr difference between the 760 torr sea level $P_A$ and the 630 torr high plains $P_A$. Therefore, as the chamber 61 is evacuated down to an absolute chamber pressure $P_C$ of 100 torr, the differential pressure $\Delta P$ at the high plains location will be −530 torr instead of the −660 torr at the sea level location.

The same 130 torr discrepancy between this sea level example and this high plains location example shows in all of the differential pressure $\Delta P$ measurements as the chamber pressure $P_C$ is lowered. In other words, lowering the absolute chamber pressure $P_C$ of 100 torr down to 10 torr—a 90 torr drop—correspondingly lowers both the sea level location differential pressure $\Delta P$ and the high plains location differential pressure $\Delta P$ by 90 torr, i.e., from −660 torr down to −750 torr at the sea level location and −530 torr at the high plains location, as shown in FIG. 2. Likewise, lowering the absolute chamber pressure $P_C$ another 9 torr down to 1 torr would lower the differential pressures $\Delta P$ at the sea level location and the high plains locations to −759 torr and −629 torr, respectively. An absolute chamber pressure $P_C$ of 0.1 torr corresponds to differential pressures of $\Delta P$ of −759.9 torr at the sea level location and −629.9 torr at the high plains location, and 0.01 torr, 0.001 torr, 0.0001 torr, and 0.00001 torr absolute chamber pressures $P_C$ correspond to −759.99 torr, −759.999 torr, −759.9999 torr, and −759.99999 torr at the sea level location and to −629.99 torr, −629.999 torr, −629.9999 torr, and −629.99999 torr at the high plains location.

While there are absolute pressure sensors available that can measure pressures down to 0.00001 torr (i.e., $10^{-5}$ torr) and below quite accurately and reliably, the available differential pressure sensors effectively bottom out in accuracy at about one decimal place, i.e., when the absolute chamber pressure $P_C$ is about 0.1 torr. At about that level, differential pressure ΔP measurements down to any further decimal places, such as −759.99 torr or −759.999 torr for the example sea level location and −629.99 torr or −629.999 torr for the example high plains location, are practically meaningless, just as the difference between differential pressure ΔP measurement $P_{30}$ with the differential pressure sensor 30 of −660.99 torr and −660.999 torr at the sea level location would be practically meaningless, because the available differential pressure sensors are just not accurate to more than one or two decimal places in torr units. However, in the upper pressure ranges, for example, above 100 torr, measurement accuracies to one or even zero decimal places is usually sufficient for most process operations. Therefore, correlating absolute chamber pressure $P_C$ measurements $P_{20}$ from the absolute pressure sensor 20 to the effectively bottomed-out differential pressure ΔP measurements $P_{30}$ from the differential pressure sensor 30 when the absolute chamber pressure $P_C$ is below a threshold pressure $P_t$ of 1 torr or perhaps 0.1 torr or lower, depending on the decimal places of accuracy needed at higher differential pressure ΔP measurements, provides an effective, accurate, and repeatable baseline for normalizing the differential pressure sensor 30 measurements to the absolute pressure sensor 20 measurements. With such baseline normalization, the differential pressure sensor 30 measurements $P_{30}$ can, according to this invention, be normalized or converted with a normalizing correlation factor to virtual absolute chamber pressure $P_C$ measurements $P_V$, including in the higher chamber pressure $P_C$ ranges, where the differential pressure sensor 30 is most accurate and dependable and the absolute pressure sensor 20 losses its accuracy and dependability. For example, if the differential pressure ΔP measurements $P_{30}$ of differential pressure pressure sensor 30 are normalized to the accurate and reliable absolute chamber pressure sensor 20 measurements $P_{20}$, when the chamber pressure $P_C$ is at a baseline threshold pressure $P_t$ of 1 torr or below, then, as the absolute chamber pressure $P_C$ rises above some cross-over pressure level $P_X$, such as 100 torr, where the differential pressure sensor 30 is more accurate and reliable than the absolute pressure sensor 20, the differential pressure ΔP measurements $P_{30}$ of the differential pressure sensor 30 can be converted to accurate and reliable virtual absolute chamber pressure $P_C$ measurements $P_V$ all the way up to atmospheric pressure $P_A$ level and above. In fact, a piezo differential pressure sensor is accurate from about 100 torr below atmospheric pressure $P_A$ to about 1,500 torr above atmospheric pressure $P_A$, which is a range of about 1,600 torr. Therefore, normalizing such differential pressure measurements $P_{30}$, as described above, can provide accurate and dependable virtual absolute pressure measurements $P_V$ over a 1,600 torr range. The exact lower and upper ends 43, 45 of such virtual absolute pressure measurement $P_V$ range on the absolute pressure scale 40 will depend on what the atmospheric pressure pressure $P_A$ happens to be at any particular time, as illustrated in FIG. 4, which is described in more detail below.

Figure 4:
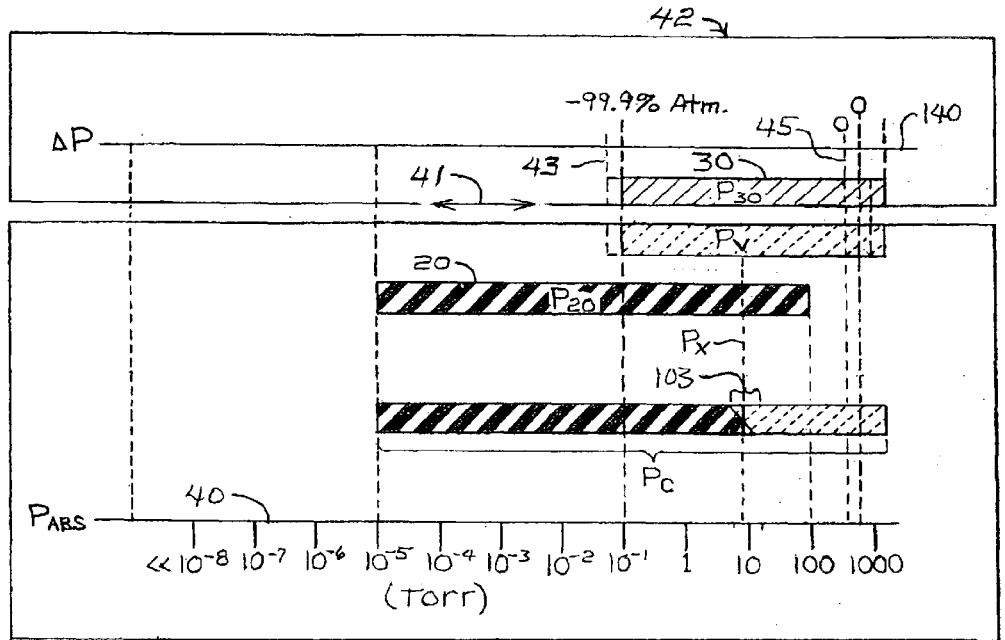
FIG. 4 is a bifurcated bar chart illustrating the effective differential and absolute pressure ranges of two pressure sensors, one differential and the other absolute, for producing absolute pressure measurements over a wide range of pressures on a single absolute pressure scale according to this invention.

An example normalizing method for implementing this invention to produce such virtual absolute chamber pressure $P_C$ measurements $P_V$ is illustrated in FIGS. 3 and 4, although other methods or variations can be devised by persons skilled in the art, once they understand the principles of this invention. For purposes of explanation of this method in FIG. 3, reference is also made to a chart of effective measuring ranges of example absolute and differential pressure sensor 20, 30 ranges in FIG. 4 and an example load lock chamber 61 pressure profile in FIG. 5, as well as with continuing reference to the FIGS. 1 and 2 discussed above.

In this example, the absolute pressure sensor 20 is shown in FIG. 4 to have an effective measuring range extending from about 100 torr down to about $10^{-5}$ torr, and the absolute pressure measurements by the absolute pressure sensor 20 are called $P_{20}$ for convenience. The micropirani absolute pressure sensor described in U.S. patent application No. 09/907,541, which is incorporated herein by reference, has this kind of range, while conventional convection pirani absolute pressure sensors have a somewhat narrower range of about 100 torr down to about $10^{-3}$ torr. Other thermal conductivity type absolute pressure sensors as well as diaphragm based absolute pressure sensors, such as low range capacitive manometers, low range piezo, strain gauge, and others also are effective in the upper portions of this example absolute pressure sensor range.

The differential pressure sensor 30 for this example description is shown in FIG. 4 to have an effective measuring range from above atmospheric pressure (e.g., about 1,500 torr above $P_A$) down to about minus 99.9 percent of atmospheric pressure (−99.9% Atm), i.e., down to about $10^{-1}$ torr, although it is more accurate and reliable above about 1 torr. The differential pressure measurements by the differential pressure sensor 30 are called $P_{30}$ for convenience, and, as mentioned above, absolute pressure measurements by the absolute pressure sensor 20 are called $P_{20}$.

The bar chart in FIG. 4 is divided into a differential pressure domain 42 on top and an absolute pressure domain 44 on bottom to aid in illustrating the concept that the differential pressure sensor 30 output measurements $P_{30}$ shift laterally in relation to the absolute pressure scale 40 and to the absolute measurements $P_{20}$, as indicated by arrow 41 and phantom lines 43, 45 in FIG. 4, with the amount of such shift depending on the changes in atmospheric pressure. If the atmospheric pressure $P_A$ is higher, the differential pressure measurements $P_{30}$ shift to the right in relation to the absolute pressure seal 40 in FIG. 4, and, if the atmospheric pressure $P_A$ moves lower, the differential pressure measurements shift to the left in relation to the absolute pressure scale 40.

Figure 5:
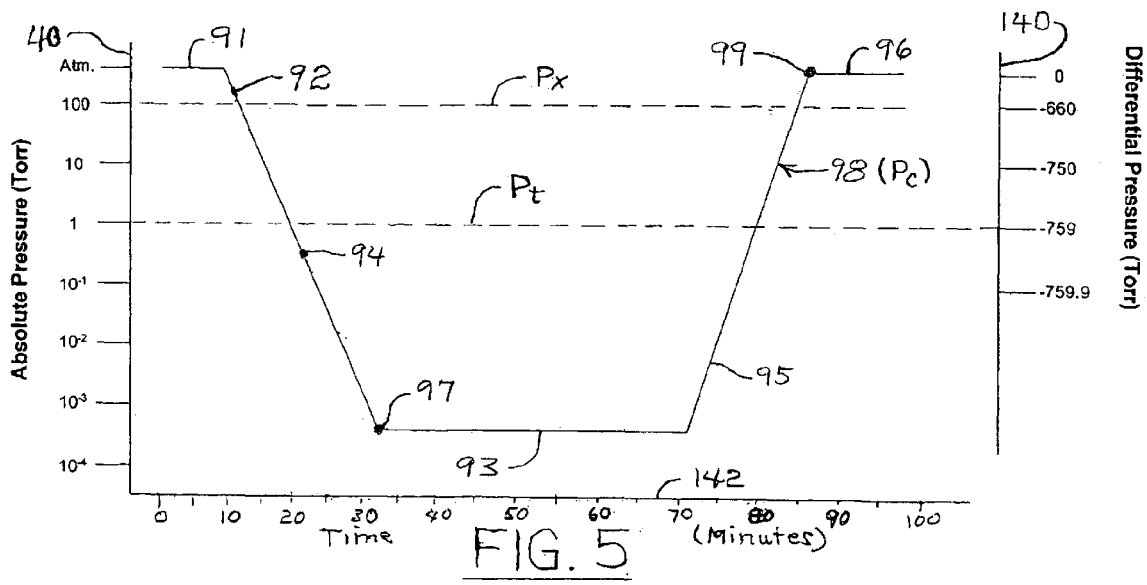
FIG. 5 is a pressure profile of a conventional load lock control cycle illustrating an example application of the integrated combination absolute and differential pressure transducer illustrated in FIGS. 1–4.

The absolute pressure profile 98 in FIG. 5 is an enlargement of the absolute pressure profile 98 for a typical load lock cycle in the display 90 of FIG. 1. The scale 40 at the left is absolute pressure in torr, the scale 140 at the right is differential pressure in torr, and the scale 142 at the bottom is time in minutes, although any suitable pressure and time units can be used. To re-cap, the cycle starts at atmospheric pressure $P_A$ indicated at 91, and it descends downwardly 92 during evacuation of the load lock chamber 61 to a base level pressure 93, where it is held for a time during transfer of a wafer 73 into (and, if desired, back out of) the reaction chamber 70 (FIG. 1). Then, as the load lock chamber 61 (FIG. 1) is back-filled, the absolute chamber pressure $P_C$ rises back, as shown at 95, to atmospheric pressure $P_A$ as indicated at 96.

The absolute chamber pressures $P_C$ for the absolute pressure profile 98, as well as for certain switching functions for the load lock operation (e.g., opening the throttle valve 66 at a pressure point 94, and opening the interior door 62 at a pressure point 97) can be provided, for example, by the method 10 shown in FIG. 3. At the start of the method 10, it is desirable, although not necessary, to choose an initial correlation factor $F_0$ 46 for use in converting differential pressure measurements $P_{30}$ to normalized virtual absolute pressure measurements $P_V$. For example, the initial correlation factor $F_0$ could be at 760 torr for a sea level location or at 630 torr at a high plains location, which would provide an approximation good enough for the first part of the absolute pressure profile 98 down to the cross-over pressure $P_X$ for the first load lock cycle. Therefore, the correlation factor F is set at 47 in FIG. 3 equal to the initial correlation factor $F_0$. The absolute pressure measurement $P_{20}$ and the differential pressure measurement $P_{30}$ are read at 48 from the absolute pressure sensor 20 and from the differential pressure sensor 30.

The differential pressure $\Delta P$ is set at 49 to the value of the measurement $P_{30}$ and is output at 50 for any desired display or control functions, such as to open the exterior door 64 of the load lock 60 (FIG. 1) when $\Delta P=0$, as indicated at 99 in the example process pressure profile in FIG. 5. Then, the virtual absolute chamber pressure measurement $P_V$ is calculated at 51 by adding the correlation factor F to the differential pressure measurement $P_{30}$. For example, if the correlation factor F is 760 torr, then the virtual absolute chamber pressure measurement $P_V$ is the differential pressure measurement $P_{30}$ plus 760 torr.

Next, as shown in FIG. 3, if the absolute chamber pressure $P_C$ measurement $P_{20}$ is not greater than the cross-over pressure level $P_X$ at 52, then the absolute chamber pressure $P_C$ is set equal to the absolute pressure measurement $P_{20}$ at 53. If $P_{20}$ is greater than the cross-over pressure level $P_X$ at 52, then the absolute chamber pressure $P_C$ is set equal to the virtual absolute chamber pressure measurement $P_V$ at 54. Then, the absolute chamber pressure $P_C$, whether set equal to $P_{20}$ at 53 or equal to $P_V$ at 54, is output at 55 for any desired control and display functions. Alternatively, the test at 52 could be whether $P_V > P_X$ instead of whether $P_{20} > P_X$, with an equivalent effect.

Finally, if the absolute chamber pressure measurement $P_{20}$ is not less than the correlation threshold pressure $P_t$ at 56, then the method 10 loops back via 57 to obtain another reading of the absolute chamber pressure measurement $P_{20}$ and of the differential pressure measurement $P_{30}$ for another iteration through the logic to obtain new $\Delta P$ and $P_C$ values as the chamber pressure $P_C$ decreases. However, if the absolute chamber pressure measurement $P_{20}$ is less than the correlation threshold pressure $P_t$ at 56, then the correlation factor F is recalculated at 58 before the method 10 loops back via 59 for another iteration. As discussed above the correlation threshold pressure $P_t$ is preferably, but not necessarily, low enough to be at or near the bottom of the differential pressure measuring capability of the differential pressure sensor 30 at whatever minimum decimal place is needed for the precision desired in the virtual pressure measurements $P_V$. However, $P_t$ should not be so low that the actual absolute chamber pressure $P_C$ never or rarely gets that low, because, according to the method 10, the correlation factor F only gets updated to compensate for any atmospheric pressure $P_A$ changes due to weather changes or other causes, when the absolute chamber pressure $P_C$ falls below $P_t$. Therefore, if the chamber pressure $P_C$ is cycled to drop below $P_t$ every hour, for example, the correlation factor F will be updated every hour to compensate for any atmospheric pressure $P_A$ changes due to weather or otherwise. Such updates keep the $P_C$ outputs at 55 accurate, even above $P_X$, regardless of atmospheric pressure $P_A$ changes.

While setting the correlation pressure threshold $P_t$ at or very near a level where the differential pressure sensor 30 measuring capabilities essentially zero out is very convenient and effective, especially for processes that cycle down below that level quite often, any pressure level where the relationship between an accurate, reliable, absolute pressure measurement and a differential pressure is known can be used to determine the correlation factor. For example, if the absolute atmospheric pressure $P_A$ is known from some other source at a particular instant in time when the differential pressure sensor measures zero, such absolute atmospheric pressure $P_A$ value can be used to set the correlation factor F. Such other source could be, for example, another absolute pressure sensor that is accurate and reliable at that level.

As mentioned above, and as shown in FIG. 4, the absolute chamber pressure $P_C$ output at 55 in the method 10 in FIG. 3 comprises a continuous composite of absolute pressure measurements $P_{20}$ and virtual absolute pressure measurements $P_V$, which effectively extends the range of accurate and reliable absolute chamber pressure $P_C$ measuring capability higher than the capability of the absolute pressure sensor 20 alone—all the way up to atmospheric pressure $P_A$ and beyond. The cross-over pressure $P_X$ is preferably selected to be at the level at which virtual absolute pressure measurements $P_V$ are more accurate and reliable than absolute pressure measurements $P_{20}$ from absolute pressure sensor 20 and vice-versa. This simple cross-over at $P_X$, where $P_X$ is a single pressure point, is acceptable for many applications. However, any common smoothing function, which is known to persons skilled in the art, can be used, if desired, to blur or spread the cross-over level over a range 103 to ensure that the pressure profile 98 in FIG. 5 does not have a sharp bend or kink where the cross-over occurs. Basically, a smoothing function starts by weighting the $P_C$ value more with $P_{20}$ at one end of the range 103 and changing gradually to weighting the $P_C$ value more heavily with $P_V$ at the other end of the range 103 so that the $P_C$ output in the range 103 would be a blended value of $P_{20}$ and $P_V$.

With the correlation factor F updated at 58 in FIG. 3 after the absolute chamber pressure measurement $P_{20}$ falls below the correlation threshold pressure $P_t$, as explained above, the output $P_C$ at 55 is an accurate measurement of the absolute chamber pressure $P_C$ all the way up the rising portion 95 of the chamber pressure profile 98 to atmospheric pressure 96 and above. However, the differential pressure $\Delta P$ output at 50 in FIG. 3 can still be used to open the exterior door 64 (FIG. 1), if desired. That same updated correlation factor F continues to be used for the correlation of the differential pressure measurements $P_{30}$ to virtual absolute pressure pressure measurements $P_V$ at 49 in FIG. 3 for the descending portion 92 (FIG. 5) of the next load lock evacuation cycle, since it is the correlation factor F that is related most recently to the actual atmospheric pressure $P_A$ and is, therefore, usually more accurate than the initial correlation factor $F_0$.

The logic in the process discussed above and illustrated in FIGS. 3–5 can be implemented in any manner, such as a microprocessor 80, as shown in FIG. 1 or any other convenient manner known to persons skilled in the art. Signals from the absolute and differential pressure sensors 20, 30 can be communicated to the microprocessor 80 by any convenient communication links 21, 31, and signals from the microprocessor to operate the doors 62, 64, the throttle valve 66, and the display 90 can be via suitable communication links 84, 83, 68, 86, respectively. Such communications links can be hard wired, radio frequency, infrared, sound, or any other signal communication technique. Also, the signals and processed information can be handled or stored in any buffers, filters, amplifiers, analog-to-digital converters, memory devices, and other conventional signal processing components (not shown), as is known to persons skilled in the art. The display 90 is used generically here and can be visual, printed, projected, or any component for receiving, using, storing, or displaying the pressure outputs $\Delta P$ and/or $P_C$ from the process described in relation to FIG. 3 or otherwise in accordance with this invention. The pressure sensor 78 can be, but does not have to be, connected to the microprocessor 80 via communication link 85 for monitoring, comparison, display, or the like.

Figure 7:
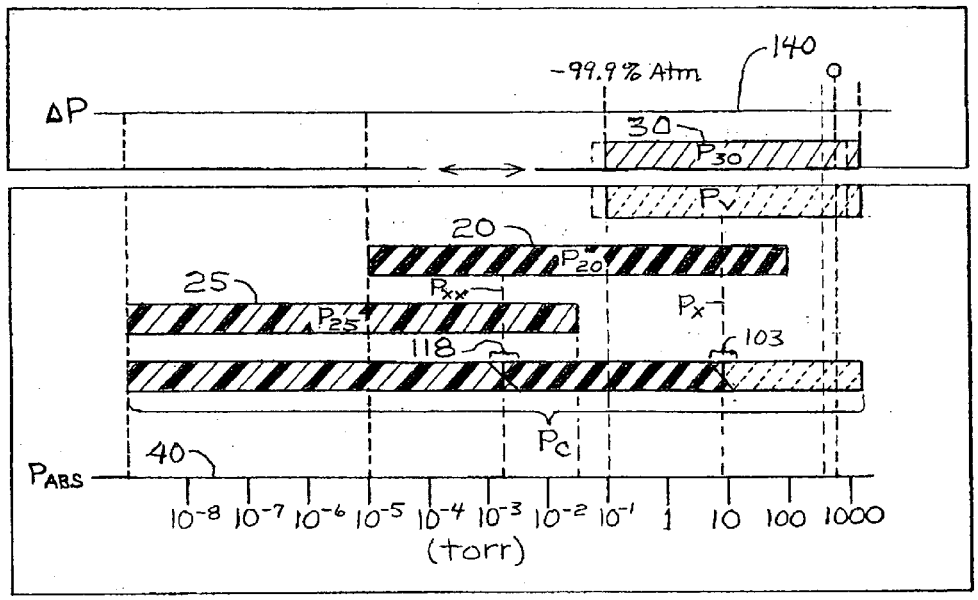
FIG. 7 is a bifurcated bar chart similar to FIG. 4, but including the pressure measuring range of the second, lower, absolute pressure sensor for producing absolute pressure measurements over the larger range.
Figure 8:
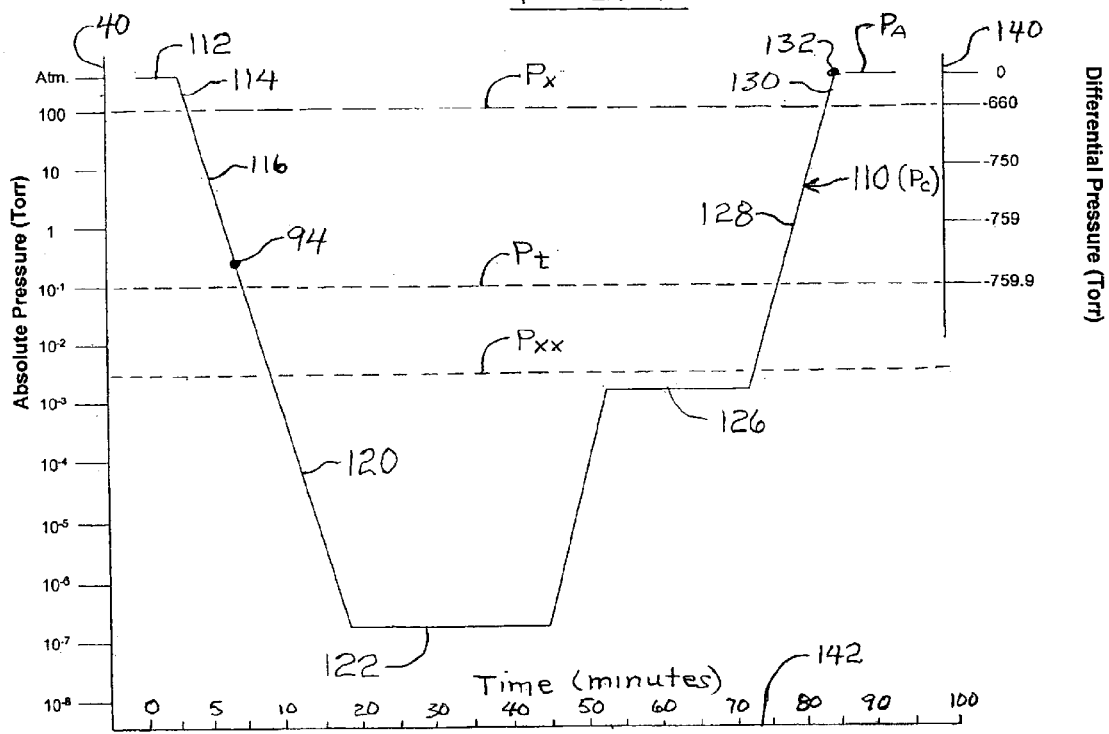
FIG. 8 is a pressure profile of a conventional vacuum process cycle illustrating an example application of the integrated combination absolute and differential pressure transducer illustrated in FIGS. 6–7.
Figure 9:
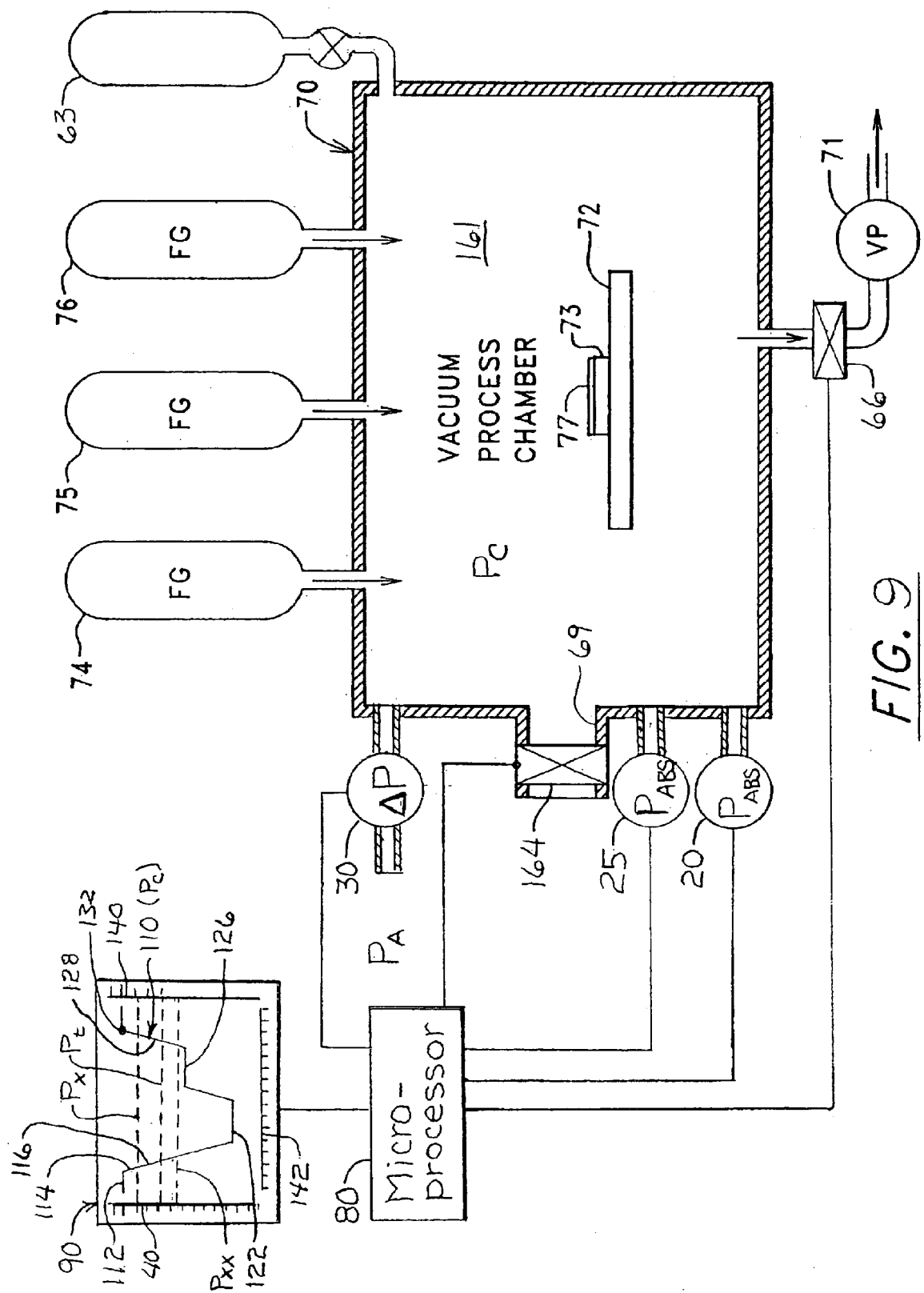
FIG. 9 is a diagrammatic view of a vacuum process chamber similar to FIG. 1, but without the load lock, fitted with two absolute pressure sensors, one mid-range and the other low-range, and a differential pressure sensor to extend the absolute pressure measuring range on a continuous scale according to this invention.

As explained above and illustrated in FIG. 4, the absolute pressure sensor 20, with current technologies, is unlikely to be able to measure very low absolute pressures, e.g., below $10^{-4}$ or $10^{-5}$, and still extend high enough, e.g., 1 to 100 torr, to get within a useable correlation range, e.g., $10^{-2}$ to 1 torr. Absolute pressure sensors 20 in these ranges are considered to be mid-range absolute pressure sensors. If it is desired to evacuate the chamber pressure $P_C$ down to even lower pressure levels, such as the $10^{-7}$ torr process base pressure level 113 in the example process pressure profile 98 in FIG. 5, a second, low absolute pressure sensor 25, as shown in FIGS. 8 and 9 can be added to this invention. The low absolute pressure sensor 25 for example, an ion gauge, a hot cathode pressure sensor, or a cold cathode pressure sensor, can extend the range of accurate and reliable absolute chamber pressure $P_C$ outputs down to $10^{-8}$ torr or below, as illustrated in FIG. 7. An ion gauge, a hot cathode gauge, and a cold cathode gauge are examples of absolute pressure sensors that are capable of providing accurate and reliable absolute pressure measurements $P_{25}$ at these low absolute pressure levels.

To illustrate the operation of this second, lower range, absolute pressure sensor 25 in combination with the mid-range absolute pressure sensor 20 and the differential pressure sensor 30 in this invention, reference is made now primarily to FIGS. 6–9. In this example, the process chamber 70, shown in FIG. 9, is not equipped with a load lock, and the exterior door 164 is positioned to open and close the passage 69 into the process chamber 70. The two absolute pressure sensors 20, 25 and the differential pressure sensor 70 are all connected directly in fluid flow relation to the interior 161 of the chamber 70. The chamber pressure $P_C$ in this example, therefore, is the pressure in the interior 161 of the process chamber 70. The pressure scales 40, 140 and time scale 142 in FIG. 8 are similar to those in FIG. 5.

Figure 6:
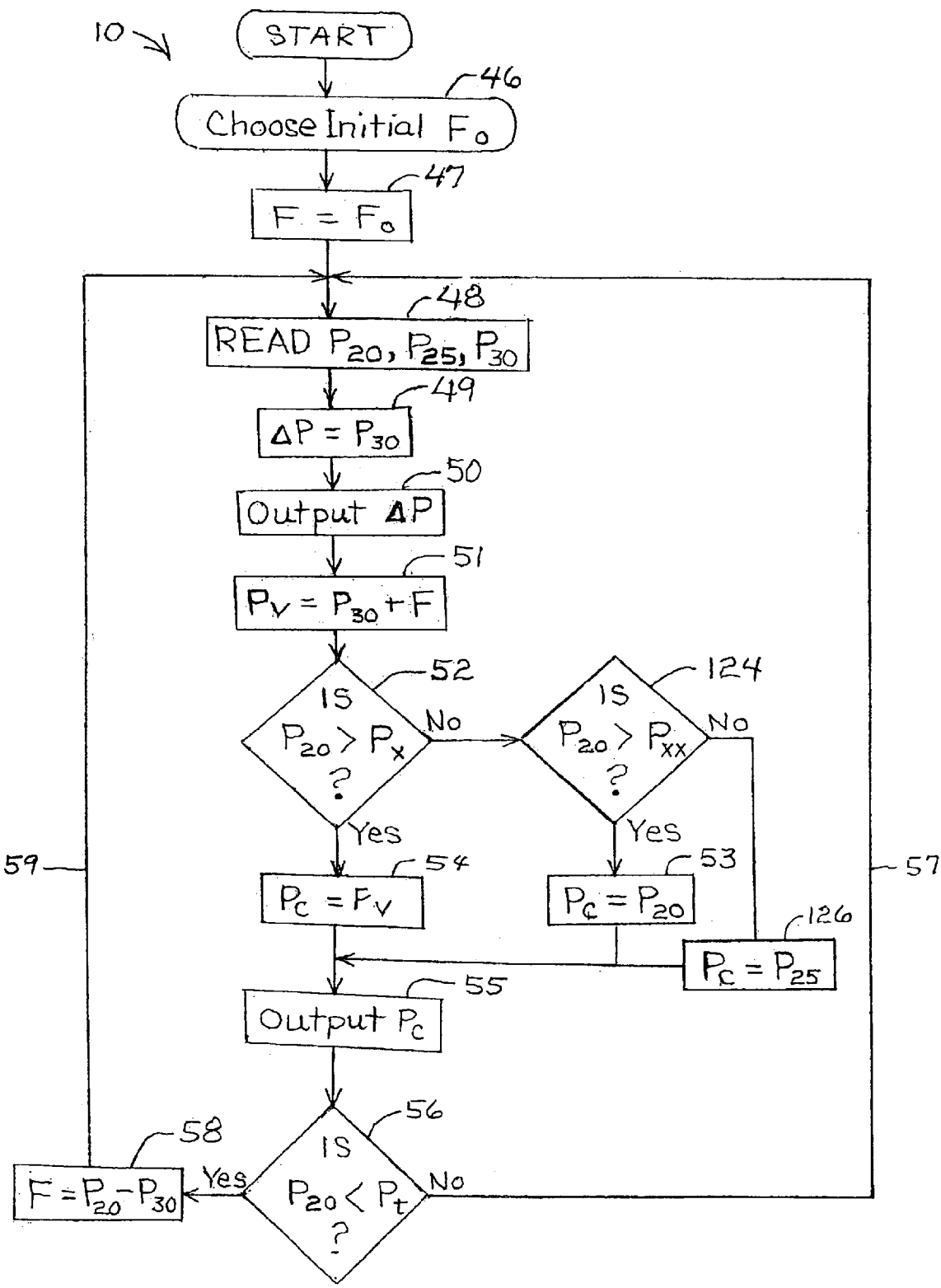
FIG. 6 is a logic flow chart illustrating an algorithm used in this invention to extend absolute pressure measurement range into the differential pressure sensor range, similar to FIG. 3, but with an additional, low range absolute pressure sensor to extend the absolute pressure measurement range to even lower pressures as well.

The mid-range absolute pressure sensor 20 and the differential pressure sensor 30 are correlated together in substantially the same manner as described above for the FIGS. 1–5 example. The initialization of the correlation factor F with an initial $F_0$ can be the same, as shown in FIG. 6. All three sensors 20, 25, 30 are read at 48 in FIG. 6 for the two absolute pressure measurements $P_{20}$, $P_{25}$ and for the differential pressure measurement $P_{30}$. When a process, such as that illustrated by the pressure profile 110 in FIG. 8, starts with the chamber pressure $P_C$ equal to atmospheric pressure $P_A$, when the door 164 is closed, the differential pressure sensor 30 is the only one that outputs accurate and reliable measurements at that pressure level 112 and in the initial portion 114 of the chamber pressure $P_C$ descent. Therefore, the differential pressure $\Delta P$ is the same as the differential pressure measurement $P_{30}$, as shown at 49, and it is output at 50 for whatever functionalities are desired, such as displays of differential pressure $\Delta P$ on a differential pressure scale 140 and opening the door at 132 after the process is completed. However, as explained above, adjusting the differential pressure measurement $P_{30}$ with the correlation factor F at 51 in FIG. 6 also produces a virtual absolute chamber pressure measurement $P_V$, which is as accurate as the correlation factor F, and which is output as the absolute chamber pressure $P_C$ at 55 for that initial portion 114 down to the cross-over pressure $P_X$. Then, when the chamber pressure $P_C$ is lowered to a range in which mid-range absolute pressure sensor 20 provides more accurate and reliable pressure measurements $P_{20}$, for example, in the range 116 below the first cross-over pressure $P_X$ in FIG. 8, the chamber pressure $P_C$ output at 55 in FIG. 6 is equal to the absolute pressure measurements $P_{20}$. A pressure point 94 in this mid-range 116 can be used to open the throttle valve 66 in FIG. 9 to bolster pumpdown speed, as explained for the FIGS. 1–5 example above. Also, as explained above, when the chamber pressure $P_C$ drops below the correlation pressure threshold $P_t$, the correlation factor F is updated at 58 in FIG. 6 to compensate for any change in the atmospheric pressure $P_A$ that may have occurred since the previous update of the correlation factor F. The connections, signal communications links, microprocessor 80, and other signal processing and handling components in the example of FIG. 9 can be similar to those described for FIG. 1, as would be obvious to persons skilled in the art, once they understand the principles of this invention, thus need not be described further herein.

Unlike the example process pressure profile 98 in FIG. 5, however, the example process pressure profile 110 illustrated in FIG. 8 continues below the pressure measuring capability of the mid-range pressure sensor 20. Therefore, from a second cross-over pressure level $P_{XX}$ or range 118, preferably where the pressure measurements $P_{20}$, $P_{25}$ are both still accurate and reliable, and down through a lower portion 120 of the process pressure profile 110 under $P_{XX}$ to the base pressure 122, the absolute chamber pressure $P_C$ output at 55 in FIG. 6 is equal to the absolute pressure measurement $P_{25}$ from the low range pressure sensor 25. This second cross-over at $P_{XX}$ is implemented at 124 and 126 in FIG. 6.

The base pressure level 122 is commonly used to draw as many impurities out of the process chamber 161 as practically possible before back-filling the process chamber 161 with an inert or an overpressure gas 63 to raise the process chamber pressure $P_C$ to a more mid-level pressure level 126, where the process feed gases 74, 75, 76 are flowed into the process chamber 161 to react and deposit the semiconductor material 77 on the substrate 73. The process pressure level 126 can be above, below, or equal to the second cross-over pressure $P_{XX}$, as desired by an operator.

At the completion of the example semiconductor 77 deposition process in FIGS. 6–9, the feed gasses 74, 75, 76 are turned off, and the back-fill gas 63 or another back-fill gas (not shown) is used to raise the process chamber pressure $P_C$ back up to the atmospheric pressure $P_A$. Through the mid-range 128 between the second cross-over pressure $P_{XX}$ and the first cross-over pressure $P_X$, the absolute pressure of the profile 110 is provided by the absolute pressure measurements $P_{20}$. Finally, in the pressure range 130 above the first cross-over pressure $P_X$, the absolute pressure $P_C$ measurements for the process pressure profile 110 are again provided by the virtual absolute pressure measurements $P_V$, which are calculated by adding the updated correlation factor F to the differential pressure measurement $P_{30}$ as explained above and shown at 52, 54, 55 of FIG. 6. Finally, when the chamber pressure $P_C$ reaches atmospheric pressure $P_A$, the differential pressure sensor 30 senses zero differential pressure $\Delta P$, and the $\Delta P$ output at 53 can be used to open the door 164 at 132, as explained above.

As explained above, any pressure level at which an accurate relationship between absolute pressure and differential pressure is known or can be measured or otherwise determined can be used to determine a correlation factor and, with the differential pressure measurements, to extend absolute pressure measurements beyond the accurate and reliable absolute pressure measuring capabilities of an absolute pressure sensor. The examples described above show this invention extending the range of absolute pressure measurements above the accurate and reliable absolute pressure measuring capabilities of an absolute pressure sensor by adding the correlation factor F to the differential pressure measurements $P_{30}$. However, the principles of this invention also work for determining and using a correlation factor along with differential pressure measurements to extend absolute pressure measurements below the accurate and dependable pressure measuring capabilities of a high range absolute pressure sensor. For example, if an absolute pressure sensor (not shown) is capable of measuring high absolute pressures, such as from 500 to 3,000 torr accurately and reliably, but could not measure absolute pressures below 1,000 torr, a differential pressure sensor that is accurate and reliable from +200% atmosphere, down to –99.9% atmosphere (approximately 1,200 to 1,500 torr down to about –760 to –600 torr, depending on the specific atmospheric pressure at the time) along with an appropriate correlation factor could be used to extend the absolute pressure measuring range below the 1,000 torr low range limit of the absolute pressure sensor, e.g., down to 0.1 torr. The correlation factor could be determined, for example, at atmospheric pressure, where the differential pressure is zero. If desired, the absolute pressure measurements could then be extended down to even lower pressures, e.g., below 1 torr down to $10^{-8}$ torr, by combining a mid-range absolute pressure sensor and a low-range absolute pressure sensor, as explained above.

Consequently, a differential pressure sensor can, according to this invention, be used to provide virtual absolute pressure measurements $P_V$ within its accurate and reliable differential pressure measuring range, on a common absolute pressure scale with absolute pressure measurements of one or more absolute pressure sensors above and/or below the differential pressure sensor range. This capability is advantageous, even if absolute pressure sensors with accurate and reliable pressure measuring capabilities are available for the same range as the differential pressure sensor in some circumstances. For example, in the FIG. 4 example described above, the absolute pressure sensor 20 could be a micropirani sensor, which, like a number of other absolute pressure sensors, a thermal conductivity type pressure sensor. Pressure readings from thermal conductivity pressure sensors change with different kinds of gasses, i.e., with different molecular contents, at higher pressures, such as over about 1 torr. In other words, for example, a thermal conductivity type absolute pressure sensor will output different pressure readings $P_{20}$ when the gas in the chamber is changed or mixed with another gas, even if the actual absolute pressure $P_C$ in the chamber does not change. Direct reading differential pressure sensors, such as piezo and capacitance diaphragm gauges, are not gas-type dependent, thus provide the same pressure readings regardless of the kinds of gasses that are introduced into the chamber. Therefore, for gas-independent absolute pressure measurements, use of the differential pressure measurements $P_{30}$ with a correlation factor F according to this invention has advantages over a thermal conductivity absolute pressure sensor for the same range. Therefore, the absolute pressure sensor not only performs two functions simultaneously according to this invention, i.e., measuring and monitoring both differential and absolute pressures in a range of about 10 torr to 1,500 torr or higher, it can also provide the absolute pressure readings in that range better than at least some absolute pressure sensors that are gas-type dependent.

The foregoing description is considered as illustrative of the principles of the invention. Furthermore, since numerous modifications and changes will readily occur to those skilled in the art, it is not desired to limit the invention to the exact construction and process shown and described above. Accordingly, resort may be made to all suitable modifications and equivalents that fall within the scope of the invention. For example, while the comparisons in decision boxes 50, 56 in FIGS. 3 and 6 are expressed in terms of "greater than" and "less than", they could be "greater than or equal to" or "less than or equal to", respectively, because these pressure levels PX and Pt do not have to be exact for this invention to function properly. Therefore, the terms "greater than" (>) is considered to include "greater than or equal to" ($\geq$), and the term "less than" is considered to include "less than or equal to" ($\leq$), for the explanations or recitations relating to the methods in FIGS. 3 and 6. Also, in both FIGS. 3 and 6, the comparison at 52 can be "Is $P_V > P_X$?" instead of "Is $P_{20} > P_X$?", as indicated above. As mentioned above, example current technology absolute pressure sensors suitable for use in this invention include the thermal conductivity-type sensors, micropirani, conventional convention pirani, hot cathode, cold cathode, ion gauge, etc,. as well as low-range diaphragm sensors such as capacitive, piezo, strain gauge, and the like. Any diaphragm differential pressure sensor and combinations of absolute pressure sensors, as mentioned above, are suitable for use in this invention. Of course, the invention would also work with any future technology absolute or differential pressure sensors. The words "comprise," "comprises," "comprising," "include," "including," and "includes" when used in this specification are intended to specify the presence of stated features, integers, components, or steps, but they do not preclude the presence or addition of one more other features, integers, components, steps, or groups thereof.

What is claimed is:

1. A method of providing an extended range of absolute pressure measurements of a gas in a chamber, comprising:
    measuring differential pressure between the gas in the chamber and the atmosphere to provide a measured differential pressure;
    measuring absolute pressure of the gas in the chamber to provide a measured absolute chamber pressure;
    establishing a cross-over pressure level;
    determining the absolute pressure in the chamber to be equivalent to the measured absolute chamber pressure, when the measured absolute chamber pressure is less than the cross-over pressure level;
    determining the absolute pressure in the chamber to be equivalent to a normalized differential pressure, when the measured absolute pressure is greater than the cross-over pressure level, including determining the normalized differential pressure by adding a correlation factor to the measured differential chamber pressure, wherein the correlation factor is equal to the measured absolute chamber pressure minus the measured differential chamber pressure.

2. The method of claim 1, including determining the correlation factor when the absolute pressure is below a correlation pressure threshold.

3. The method of claim 1, including establishing the correlation pressure threshold somewhere in a pressure range wherein instruments used to measure the differential pressure and the absolute pressure provide the measured differential chamber pressure and the measured absolute chamber pressure with as much accuracy and reliability as is needed for the extended range of absolute pressure measurements.

4. The method of claim 1, including measuring the differential pressure between the gas in the chamber and the atmosphere with a differential pressure sensor.

5. The method of claim 4, wherein the differential pressure sensor includes a diaphragm-type pressure sensor.

6. The method of claim 5, wherein the differential pressure sensor includes a piezo differential pressure sensor.

7. The method of claim 5, wherein the differential pressure sensor includes a capacitive manometer differential pressure sensor.

8. The method of claim 4, wherein the differential pressure sensor includes a thermal couple differential pressure sensor.

9. The method of claim 1, including measuring the absolute pressure of the gas in the chamber with an absolute pressure sensor.

10. The method of claim 9, wherein the absolute pressure sensor includes a thermal conductivity type pressure sensor.

11. The method of claim 10, wherein the absolute pressure sensor includes a pirani-type pressure sensor.

12. The method of claim 9, wherein the absolute pressure senor includes a capacitance manometer pressure sensor.

13. A method of providing an absolute chamber pressure profile of gas pressure in a chamber as the pressure in the chamber changes over time, comprising:

measuring absolute pressure in the chamber with an absolute pressure sensor that has an accurate and dependable range of absolute pressure measuring capability;

measuring differential pressure between the chamber and atmospheric pressure with a differential pressure sensor that has an accurate and dependable range of differential pressure measuring capability, which corresponds with at least a portion of the accurate and dependable range of the absolute pressure sensor;

determining a correlation factor between an absolute pressure measurement from the absolute pressure sensor that is considered to be accurate and reliable and a differential pressure measurement from the differential pressure sensor taken at the same time as the absolute pressure measurement;

using the absolute pressure measurements from the absolute pressure sensor for the absolute chamber pressure profile in pressure ranges where the absolute pressure measurements from the absolute pressure sensors are more accurate and reliable than the differential pressure measurements from the differential pressure sensor; and using the differential pressure measurements from the differential pressure sensor, adjusted by the correlation factor to provide virtual absolute pressure measurements, for the absolute chamber pressure profile where the differential pressure measurements from the differential pressure sensor are more accurate and reliable than the absolute pressure measurements from the absolute pressure sensor.

14. The method of claim 13, including determining the correlation factor by subtracting a differential pressure measurement from an absolute pressure measurement, which is taken at the same time as the differential pressure measurement.

15. The method of claim 14, including subtracting a differential pressure measurement from an absolute pressure measurement taken at a time when the absolute chamber pressure is low enough to be at or below the bottom of the accurate and dependable range of differential pressure measuring capability.

16. The method of claim 15, wherein the bottom of the accurate and dependable range of differential pressure measuring capability is a correlation pressure threshold, and wherein the method includes cycling the chamber pressure up and down in such a manner that the absolute pressure measurements from the absolute pressure sensor repeatedly drop below the correlation pressure threshold and determining the correlation factor again each time that the absolute pressure measurements drop below the correlation pressure threshold to adjust the correlation factor for any changes in atmospheric pressure that occur during such cycling.

17. The method of claim 14, including subtracting a differential pressure measurement from an absolute pressure measurement taken at a time when the chamber pressure is equal to the atmospheric pressure.

18. The method of claim 13, including measuring the absolute pressure in the chamber with an absolute pressure sensor that has an accurate and dependable range of absolute pressure measuring capability, which extends below the accurate and dependable range of the differential pressure measuring capability.

19. The method of claim 18, including:

selecting a cross-over pressure level in the portion of the accurate and dependable range of differential pressure measuring capability that corresponds with the portion of the accurate and dependable range of the absolute pressure sensor;

using the absolute pressure measurements from the absolute pressure sensor for the absolute chamber pressure profile when the absolute pressure measurements of the chamber pressure from the absolute pressure sensor are below the cross-over pressure level; and using the virtual absolute pressure measurements for the absolute chamber pressure profile when the virtual absolute pressure measurements of the chamber pressure are above the cross-over pressure level.

20. The method of claim 19, wherein the cross-over pressure level is at a single pressure value.

21. The method of claim 19, wherein the cross-over pressure level comprises a cross-over pressure range and the method includes using blended absolute pressure values comprising weighted averages of both absolute pressure measurements and virtual absolute pressure measurements in said cross-over pressure range for the absolute chamber pressure profile.

22. The method of claim 18, wherein said absolute pressure sensor is a first absolute pressure sensor and the method includes:

measuring the absolute pressure in the chamber with a second absolute pressure sensor that has an accurate and dependable range of absolute pressure measuring capability, a first portion of which is coincident with a portion of the accurate and dependable range of the first absolute pressure sensor, and a second portion of which extends to absolute pressures below the accurate and dependable range of the first absolute pressure sensor; and using absolute pressure measurements from the second absolute pressure sensor for the absolute chamber pressure profile in pressure ranges where the absolute pressure measurements from the second absolute pressure sensor are more accurate and reliable than the absolute pressure measurements from the first absolute pressure sensor.

23. Apparatus for measuring absolute pressure in a chamber, i.e., chamber pressure, over time, comprising:

a differential pressure sensor for measuring differential pressure between atmospheric pressure and the chamber pressure;

an absolute pressure sensor for measuring the absolute pressure in the chamber;

means connected to the differential pressure sensor and to the absolute pressure sensor for determining a correlation factor between absolute pressure measurements from the absolute pressure sensor and differential pressure measurements from the differential pressure sensor;

means for adjusting differential pressure measurements from the differential pressure sensor with the correlation factor to produce virtual absolute pressure measurements; and means for outputting the absolute pressure measurements from the absolute pressure sensor in chamber pressure ranges where the absolute pressure measurements from the absolute pressure sensor are more accurate and reliable than the virtual absolute pressure measurements and for outputting the virtual absolute pressure measurements in chamber pressure ranges where the virtual pressure measurements are more accurate and reliable than the absolute pressure measurements from the absolute pressure sensor.

* * * * *